United States Patent [19]
Hebenstreit et al.

[11] Patent Number: 5,745,261
[45] Date of Patent: Apr. 28, 1998

[54] REPRODUCTION OF PICTORIAL MASTERS

[75] Inventors: Jörk Hebenstreit, Jena; Wilfried Reichel, Gera; Helmut Bock, Jena, all of Germany

[73] Assignee: AGFA-Gevaert Aktiengesellschaft, Leverkusen, Germany

[21] Appl. No.: 675,519

[22] Filed: Jul. 3, 1996

Related U.S. Application Data

[63] Continuation of Ser. No. 116,054, Sep. 2, 1993, abandoned.

[30] Foreign Application Priority Data

Sep. 11, 1992 [DE] Germany .................. 42 30 449

[51] Int. Cl.$^6$ .................................................. H04N 1/46
[52] U.S. Cl. .................. 358/501; 358/506; 358/509; 358/527
[58] Field of Search .......................... 358/501, 504, 358/505, 506, 507, 509, 527, 401, 406, 474, 487; 355/18, 20, 32, 35, 38

[56] References Cited

U.S. PATENT DOCUMENTS

| | | | |
|---|---|---|---|
| 4,279,502 | 7/1981 | Thurm | 355/38 |
| 4,751,569 | 6/1988 | Clinton et al. | 358/501 |
| 4,933,773 | 6/1990 | Shiota et al. | 358/302 |
| 4,942,462 | 7/1990 | Shiota | 358/527 |
| 5,003,381 | 3/1991 | Wagensonner | 358/506 |
| 5,057,913 | 10/1991 | Nagata et al. | 358/527 |
| 5,101,286 | 3/1992 | Patton | 358/506 |
| 5,192,970 | 3/1993 | Findeis et al. | 355/38 |

FOREIGN PATENT DOCUMENTS

| | | |
|---|---|---|
| 0 308 967 | 3/1989 | European Pat. Off. . |
| 3628917 | 2/1987 | Germany . |
| 3824096 | 1/1989 | Germany . |

*Primary Examiner*—Thomas D. Lee
*Attorney, Agent, or Firm*—Darby & Darby

[57] ABSTRACT

A printer has a scanning station where the negatives of a film are scanned zone-by-zone. One or more of the negatives are subsequently printed at a printing station by directing a beam of light through the negatives and onto a first photographic copy material. An exposure control unit adjusts the color composition and intensity of the light beam on the basis of data from the scanning station. Once a negative at the printing station has been printed in this manner, a reflector is moved into the path of the light beam between the negative and the copy material. The reflector deflects the light beam to a video camera which scans the negative line-by-line and point-by-point to generate a series of electrical signals representing an image of the negative. The signals are sent to a memory where they are combined with information about the image. A cathode ray tube connected to the memory then prints the image line-by-line and point-by-point, together with the relevant information, on a second photographic copy material.

25 Claims, 1 Drawing Sheet

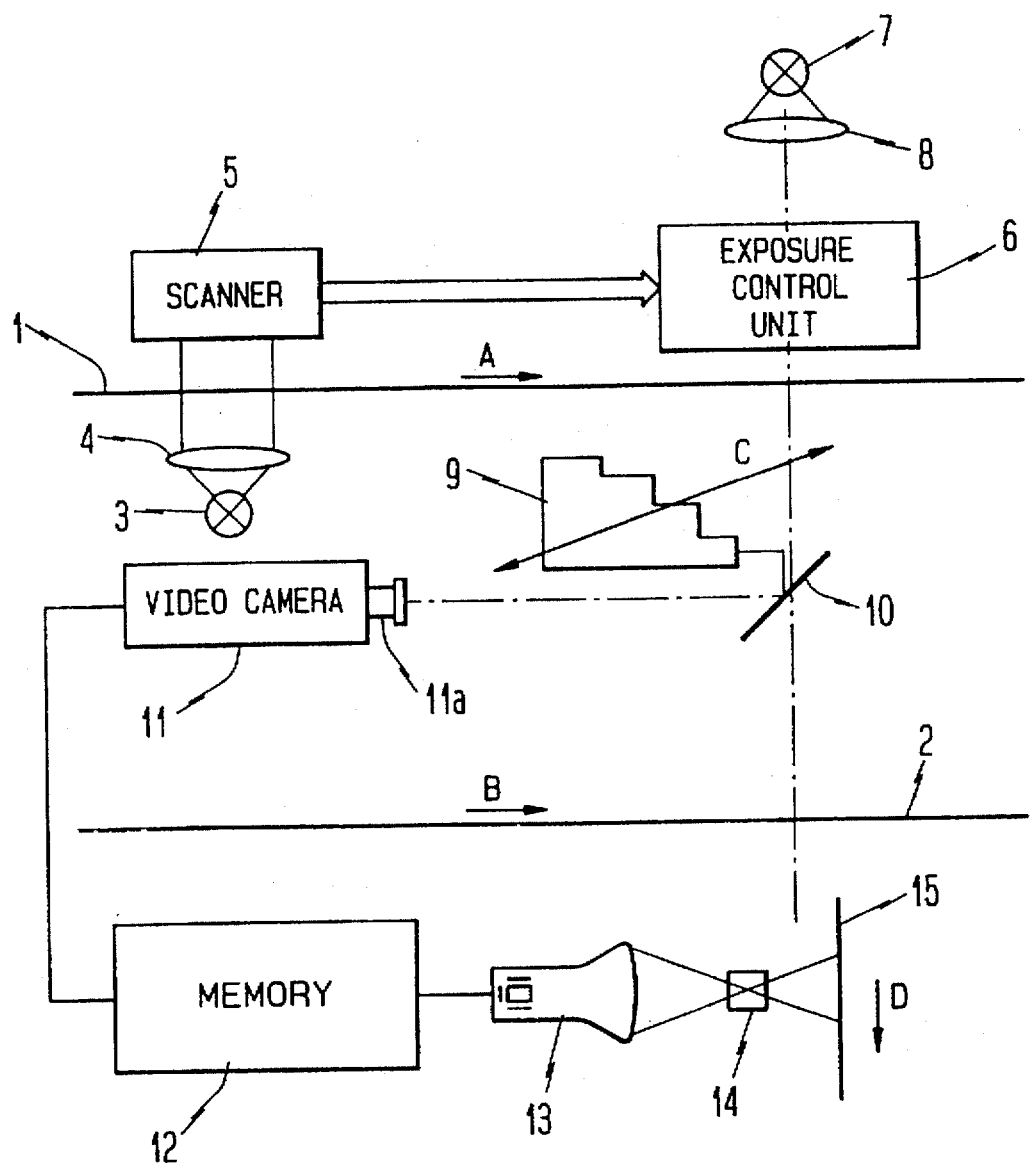

REPRODUCTION OF PICTORIAL MASTERS

This is a continuation of application Ser. No. 08/116,054, filed Sep. 2, 1993 now abandoned.

BACKGROUND OF THE INVENTION

The invention relates generally to the reproduction of masters, especially pictorial masters.

More particularly, the invention relates to the reproduction of a master by scanning the latter to generate a series of signals which are then used to make a copy of the master on photographic material.

Electronic printing methods in which a series of signals containing density data for a master are read into a memory are being increasingly used in pictorial color photography, e.g., for the production of paper images from diapositives. Electronically printed images are also being found more and more in other areas such as, for example, the yearbooks of universities and schools where so-called registry images, class pages, etc. are electronically assembled from image data obtained by the school photographer.

In a known system for the production of registry images, sets of master photographs of the various students of a school class are reviewed to select the masters best suited for enlargement. The review is carried out at a work station having a picture screen, and the masters are also examined here in order to provide them, e.g., manually, with appropriate color and density corrections for the printing procedure. The masters are further scanned at the work station to generate a series of image signals which are then read into a memory. In order to make yearbooks or registry images, the signals are retrieved from the memory, combined with personal information such as names, etc., and electronically printed on a suitable photosensitive material.

A drawback of this procedure is that the image signals, before being read into the memory, must be visualized on a picture screen together with a reference image in order to be corrected. When there are several pictures of a person, it is also necessary to decide which of these pictures is to be read into the memory.

SUMMARY OF THE INVENTION

It is an object of the invention to facilitate the reproduction of master images which have been converted into signals.

Another object of the invention is to make it easier to produce registry pictures from films such as those of a school photographer.

An additional object of the invention is to simplify the work involved in preparing image signals for conversion into prints.

The preceding objects, as well as others which will become apparent as the description proceeds, are achieved by the invention.

One aspect of the invention resides in a method of copying a master, e.g., a pictorial master. The method comprises the steps of introducing the master into a copier; making a first copy of at least one selected portion of the master by directing radiation to the selected portion and onto photographic material; scanning the master to generate a set of image signals representing at least one predetermined portion of the master; and producing a second copy of the predetermined portion using the image signals. The steps of making the first copy and scanning the master are performed in the copier.

The copier may be designed to generate the first copy by integral exposure of the master, or of the selected portion thereof, onto the photographic material. The step of making the first copy then involves irradiating all of the master, or all of the selected portion of the master, at one time.

The scanning step is preferably carried out with an electronic scanner. The step of producing the second copy may include point-by-point and line-by-line exposure of photographic material by means of an image recorder which is regulated by the image signals.

The method can further comprise the step of storing the image signals between the scanning and producing steps.

The method may additionally comprise the step of selecting the master to be reproduced from a plurality of masters. The method may also comprise the step of delimiting the predetermined portion of the master so that only such portion is scanned during the scanning step. The selecting step, as well as the delimiting step, can be performed at a viewing station.

The method can further comprise the step of determining exposure data, which is optimized as to color or density or both, for the making of the first copy. The scanning step is then performed using this exposure data. The exposure data may include density values, and the scanning step may involve sensing radiation coming from the master, and regulating the intensity of the sensed radiation on the basis of the density values.

The step of making the first copy may comprise directing a radiation beam at the master and adjusting the color composition of the beam, the intensity of the beam or both.

Another aspect of the invention resides in a copier. The copier comprises first means for copying at least one selected portion of a master by directing radiation to the selected portion and onto photographic material; means for scanning the master to generate a set of image signals representing at least one predetermined portion of the master; and second means for producing a copy of the predetermined portion using the image signals. The scanning means is advantageously electronic and may, for instance, include a video camera.

The copier preferably further comprises means between the scanning means and the second means for temporarily storing the image signals.

The first means may be designed to generate a copy by integral exposure of the master or of the selected portion thereof. The first means then comprises means for irradiating all of the master, or all of the selected portion of the master, at one time. On the other hand, the second means may include means for copying the predetermined portion of the master point-by-point and line-by-line.

The copier can additionally comprise a common automatic exposure control unit for the first means and the scanning means. This unit can serve, based on a zone-by-zone analysis of the master, to correct color errors and densities. To this end, the exposure control unit may include means for adjusting the color composition of radiation for the first means and the scanning means and/or the intensity of such radiation. The exposure control unit may also be designed such that the exposure time for the first means, which is determinative of the density of the resulting copy, influences the intensity of the radiation for the scanning means and/or the duration of exposure of the scanning means.

The first means may comprise means for projecting an image of the selected portion of the master along a predetermined path when the master is at a predetermined location. The copier can then comprise means for permitting detection of the projected image by the scanning means. The arrangement is preferably such that the portion of the master copied by the first means coincides with the portion of the master detected by the scanning means. The means for permitting detection of the projected image by the scanning means may, for example, include a reflector for deflecting the projected image towards the scanning means.

The first means can constitute a package printer. In such an event, the first means includes a set of objectives which can be selectively moved into the path of the projected image. The reflector for deflecting the projected image can here be coupled to the objectives in such a manner that the reflector assumes a position in the path of the projected image when the objectives assume positions out of the path.

In the known system for producing registry pictures, a master is scanned by means of a video camera at a special preparation area. In contrast, the invention performs this operation in a copier designed for integral exposure. Here, the master has already been evaluated and a determination made that, of a number of masters, it is the one best adapted for reproduction. Moreover, the exposure data for copying have already been optimized, as regards color and density, by the automatic exposure control unit of the copier. This makes it possible to scan the master properly with respect to color by appropriately adjusting the color composition of the radiation used for scanning. The optimized density data can be used to optimize the intensity of the radiation which impinges upon the photosensor of the video camera during scanning.

The novel features which are considered as characteristic of the invention are set forth in particular in the appended claims. The improved copying method, as well as the construction and mode of operation of the improved copier, together with additional features and advantages thereof, will, however, be best understood upon perusal of the following detailed description of certain specific embodiments when read in conjunction with the accompanying drawing.

BRIEF DESCRIPTION OF THE DRAWING

The sole FIGURE schematically illustrates a copier according to the invention.

DESCRIPTION OF THE PREFERRED EMBODIMENTS

In the FIGURE, the reference numeral 1 identifies a series of masters in the form of an elongated band. By way of example, the masters can include several different pictures of each of a large number of persons, such as the students at a school, taken by a photographer, e.g., a school photographer. The masters are here assumed to be negatives, and the band 1 can consist of several individual filmstrips which have been joined end-to-end.

The negatives are viewed as positives at a so-called editing area by means of a video system, for instance. The negative of each person best suited for reproduction is selected and identified "to be copied", e.g., on a data carrier accompanying the band 1. At the same time, a predetermined portion of each selected negative can be delimited by establishing masking data for the negative.

The band 1, which is conveyed along a predetermined path in the direction of the arrow A, then enters an analyzing station of the copier illustrated in the FIGURE. The analyzing station includes a source 3 of measuring light, a condenser 4 and a scanner 5. An image of each negative is formed in the scanner 5 via the measuring light source 3 and the condenser 4. The scanner 5 evaluates the negatives zone-by-zone and such evaluations can be performed, for example, in accordance with the teachings of U.S. Pat. No. 4,279,502. The data generated by the scanner 5 are used to calculate exposure data and, in order to optimize this data for each individual filmstrip of the band 1, all negatives of a filmstrip are evaluated.

The data from the scanner 5 are sent to an exposure control unit 6 which is located at a copying or printing station. The printing station is provided with a source 7 of copy light or printing light, and a condenser 8 serves to direct light from the source 7 to a negative at the printing station. An objective deck or unit 9 functions to focus a negative at the printing station onto a band 2 of copy material to thereby form a copy or print of the negative. The band 2 can be advanced along a predetermined path in the direction of the arrow B so that an unexposed segment of the band 2 can be brought into the printing station after the preceding segment has been exposed.

During printing of a negative which is located at the printing station, light from the source 7 travels to the band 2 along an optical path extending normal to the paths A and B so that an image of the negative is projected along the optical path. The objective unit 9 is shiftable back-and-forth in the directions indicated by the arrow C so that it can be moved into and out of the optical path. The objective unit 9, which can be designed in accordance with the teachings of the copending U.S. patent application Ser. No. 08/075,161 of Heinrich Hunniger et al. filed 10 Jun. 1993, for "Photographic Copier Having Different Magnifications", includes several different objectives which can be selectively positioned in the optical path. The objective unit 9 can be used for the production of so-called "Print Packages" containing several pictures of different magnification.

The exposure data calculated for the negatives to be printed include density valves and the color composition of the light to be used for printing. The exposure control unit 6 comprises a plurality of subtractive color filters which can be shifted into the optical path to a greater or lesser degree. Before impinging on a negative at the printing station, light from the source 7 passes through the subtractive filters and then a mixing shaft where it is well mixed. The mixing shaft generates a uniform beam of printing light which has the color composition calculated for the respective negative and transilluminates the latter. The intensity of the printing beam can be regulated in such a manner on the basis of the calculated density values that, within certain limits, the exposure time is the same for all negatives to be printed.

A reflector 10 inclined at 45 degrees to the vertical is coupled to the objective unit 9. The reflector 10 and objective unit 9 are so positioned relative to one another that the reflector 10 can assume a position in the optical path when the objective unit 9 assumes a position outside of the path, and vice versa. The reflector 10 serves to deflect a beam of light coming from the exposure control unit 6 through an angle of 90 degrees and to the objective 11a of a video or television camera 11. The objective 11a sharply focuses a negative at the printing station on the photosensor of the video camera 11. This photosensor, which can be considered to constitute an electronic scanning device, may be in the form of a charge-coupled device.

The photosensor of the video camera 11 converts the image of a negative at the printing station into a series of electrical image signals. The video camera 11 is connected to a memory 12 via a suitable conductor, and the image signals generated by the photosensor are sent to the memory 12 for temporary storage. The memory 12, which can include a solid state plate or optical plate, can store a large number of images. The memory 12 is connected to an image recording or printing device in the form of a cathode ray tube 13. The screen of the cathode ray tube 13 is focused on photographic copy material 15 by an objective 14. The copy material 15 which may, for instance, serve as a master for the pages of a yearbook, can be advanced stepwise in the direction of the arrow D by distances depending upon the sizes of the images to be formed on the copy material 15.

In addition to the image signals, the memory 12 can also be supplied with information about the images to be formed on the copy material 15. By way of example, if the images constitute pictures of people, the memory 12 can be provided with bibliographical information such as the names and birth dates of the people to be pictured. The bibliographical information for a person can then be printed on the copy material 15 together with a picture of the person.

The operation of the copier is as follows:

Assuming that a school photographer has taken films of various people who ordered print packages, the films are developed and then sent to an editing or preparation area together with information about the people. As indicated above, such information can include names and birth dates. There will generally be more than one negative or exposure of a person and, at the editing area, the negative best suited for reproduction is selected. In addition, the magnification or magnifications of the prints are established at the editing area and, if only a portion of a selected negative is to be reproduced, such portion is delimited at the editing area by choosing appropriate mask dimensions. At the same time, the information for a package, e.g., the number of enlargements and their dimensions, are retrieved from the accompanying order and sent to the copier of the FIGURE in machine readable form.

Once the operations at the editing area have been completed, the films are likewise sent to the copier. Prior to entering the copier, the individual films can be joined end-to-end to form the band 1. In the copier, all of the negatives of a film are initially scanned in the analyzing station 3,4,5. The results for each individual film are used to calculate the optimum exposure data for every negative of the film selected for reproduction. For color film, these exposure data can include the amount of light required in each of the primary colors red, green and blue in order to print a selected negative.

The selected negatives are next advanced to the printing station. When a selected negative is located at the printing station, the ordered enlargements are printed on the band 2 by positioning the appropriate objective or objectives of the objective unit 9 in the optical path. The printing light from the source 7 is filtered as required by the exposure control unit 6. Printing takes place by integral illumination of the selected negative, that is, the entire negative, or where the negative is masked, the entire portion of the negative delimited by the mask, is illuminated at one time. Correspondingly, the band 2 is exposed integrally in that the entire image to be copied is printed on the band 2 at one time.

Upon completion of the printing operation, the objective unit 9 is moved to a position in which the reflector 10 is located in the optical path as illustrated in the FIGURE. Consequently, a sharp image of the negative in the window of the printing station as masked is formed on the photosensor of the video camera 11. In other words, the image on the photosensor is that of the carefully selected negative, inclusive of its preselected mask, for which optimum exposure data have been established. These exposure data result in illumination of the selected negative with properly colored light and an illumination intensity which is corrected for density. Hence, the video camera 11 receives and sends to the memory 12 an image of the selected negative which is optimized in every respect.

In the memory 12, the information relating to the person pictured on the selected negative is combined with the image of the person in accordance with the particular requirements for a yearbook, an I.D. or some other item. The image and the associated information are then printed on the copy material 15 in the proper correlation via the cathode ray tube 13 and the objective 14. The cathode ray tube 13, which is regulated by the signals stored in the memory 12, performs the printing operation point-by-point and line-by-line. The copy material 15 can, for instance, be an intermediate negative film.

The mounting of the video camera 11 in a copier designed for integral exposure has the advantage that the scanner of the camera 11 receives an image of a carefully selected, optimally masked negative together with optimal exposure data for the negative. Accordingly, no further processing of the negative is required for scanning of the negative by the camera 11 and subsequent point-by-point and line-by-line printing of the negative via the cathode ray tube 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A copying method for producing prints on a first photographic material and copies of said prints on a second photographic material, comprising the steps of determining exposure data, which is optimized as to color or density or both, for a master; making a first copy of a selected major portion of said master on said first photographic material using radiation which has a color composition based on said exposure data;

converting an image resulting from said radiation into a set of image signals representing at least one predetermined portion of said master, and using said image signals to produce said second copy of said predetermined portion on a second photographic material.

2. The method of claim 1, further comprising the step of storing said signals between the converting and producing steps.

3. The method of claim 1, wherein the converting step is performed electronically.

4. The method of claim 1, wherein the producing step comprises regulating an image recorder with said signals.

5. The method of claim 1, further comprising the steps of selecting said master from a plurality of masters, and delimiting said predetermined portion so that only said predetermined portion is scanned during the converting step.

6. The method of claim 5, wherein the selecting step is performed at a viewing station.

7. The method of claim 6, wherein the delimiting step is performed at said station.

8. The method of claim 1, further comprising the step of introducing said master into a copier; and wherein the making and converting steps are performed in said copier.

9. The method of claim 1, wherein the making step comprises irradiating all of said selected portion at one time.

10. The method of claim 9, wherein the producing step is performed point-by-point and line-by-line.

11. A copier for producing prints on a first photographic material and copies of said prints on a second photographic material, comprising first means for copying a selected major portion of a master on a first photographic material by irradiating all of the selected portion at one time; means for converting an image resulting from said irradiation into a set of image signals; and means for using said image signals to produce at least one predetermined portion of the master on a second photographic material.

12. The copier of claim 11, further comprising means for storing the image signals generated by said converting means.

13. The copier of claim 11, wherein said converting means is electronic.

14. The copier of claim 11, further comprising a common automatic exposure control unit for said copying means and said converting means.

15. The copier of claim 14, wherein said unit comprises means for adjusting the color composition of a radiation beam, the intensity of a radiation beam or both.

16. The copier of claim 14, wherein said unit comprises means for adjusting the intensity of a radiation beam, the exposure time or both.

17. The copier of claim 11, wherein said converting means comprises a video camera.

18. The copier of claim 11, wherein said copying means comprises means for projecting an image of a portion of the master along a predetermined path when the master is at a predetermined location; and further comprising means for permitting detection of the projected image by said converting means.

19. The copier of claim 18, wherein said permitting means comprise s a reflector for deflecting the projected image towards said converting means.

20. The copier of claim 11, wherein said copying means is designed to irradiate all of the selected portion of the master at one time.

21. The copier of claim 20, wherein said converting means comprises means for generating the image signals in such a manner that the predetermined portion of the master is reproducible point-by-point and line-by-line.

22. A copying method for producing prints on a first photographic material and copies of said prints on a second photographic material, comprising the steps of establishing a color correction for a selected major portion of a master; making a first copy of said portion on a first photographic material by irradiating all of said portion at one time; converting an image resulting from said irradiation into a set of image signals representing said portion; and producing a second copy of said portion on a second photographic material point-by-point and line-by-line using said image signals, said irradiating and said converting being performed using a common source of radiation colored as a function of said correction.

23. A copier for producing prints on a first photographic material and copies of said prints on a second photographic material, comprising means for establishing a color correction for a selected major portion of a master; means for copying the selected portion of the master on a first photographic material by irradiating all of the selected portion at one time; and means for converting an image resulting from said irradiation into a set of image signals for point-by-point and line-by-line reproduction of the selected portion on a second photographic material, said copying means and said converting means including a common radiation source which is arranged to communicate with said establishing means.

24. A copier, comprising first means for copying at least one selected portion of a master by directing radiation to the selected portion and onto photographic material, said first means constituting a package printer and including means for projecting an image of a portion of the master along a predetermined path when the master is at a predetermined location, and said first means comprising a set of objectives which can be selectively moved into said path; means for scanning the master to generate a set of signals representing at least one predetermined portion of the master; second means for producing a copy of the predetermined portion using the signals; and means for permitting detection by said scanning means of an image projected along said path by said projecting means, said permitting means including a reflector for deflecting the projected image towards said scanning means, and said reflector being coupled to said objectives in such a manner that said reflector assumes a position in said path when said objectives assume positions out of said path.

25. A copying method for producing prints on a first photographic material and copies of said prints on a second photographic material, comprising the steps of introducing a master into a copier; determining exposure data, which is optimized as to color or density or both, for said master, said exposure data including density values; making a first copy of a selected major portion of said master on a first photographic material by irradiating all of said selected portion at one time, the making step being performed using said exposure data; converting an image resulting from said irradiation into a set of image signals representing at least one predetermined portion of said master, the converting step being performed using said exposure data, and the converting step including sensing radiation coming from said master, and regulating the intensity of the sensed radiation on the basis of said density values; and producing a second copy of said predetermined portion on a second photographic material using said signals, the making and converting steps being performed in said copier.

* * * * *